United States Patent
Stoimenov

(10) Patent No.: US 12,492,138 B2
(45) Date of Patent: Dec. 9, 2025

(54) VISCOSIFIER REMOVAL FROM BRINES

(71) Applicant: REACTION 35, LLC, Santa Barbara, CA (US)

(72) Inventor: Peter K. Stoimenov, Goleta, CA (US)

(73) Assignee: REACTION 35, LLC, Santa Barbara, CA (US)

( * ) Notice: Subject to any disclaimer, the term of this patent is extended or adjusted under 35 U.S.C. 154(b) by 427 days.

(21) Appl. No.: 18/096,804

(22) Filed: Jan. 13, 2023

(65) Prior Publication Data
US 2023/0234864 A1 Jul. 27, 2023

Related U.S. Application Data

(60) Provisional application No. 63/302,233, filed on Jan. 24, 2022.

(51) Int. Cl.
*C02F 1/52* (2023.01)
*C02F 101/30* (2006.01)
*C02F 103/10* (2006.01)

(52) U.S. Cl.
CPC ........ *C02F 1/5236* (2013.01); *C02F 2101/30* (2013.01); *C02F 2103/10* (2013.01)

(58) Field of Classification Search
CPC .............. C02F 1/5236; C02F 2101/325; C02F 2101/30; C02F 2103/10; E21B 21/063; E21B 21/065; B01D 17/047
USPC .......................................... 166/267; 210/702
See application file for complete search history.

(56) References Cited

U.S. PATENT DOCUMENTS

| | | | |
|---|---|---|---|
| 6,491,824 B1 | 12/2002 | Lin et al. | |
| 7,956,012 B2 | 6/2011 | Gupta et al. | |
| 9,593,276 B2 | 3/2017 | Livanec | |
| 2002/0130090 A1* | 9/2002 | Symens | E21B 21/068 210/753 |
| 2011/0186525 A1 | 8/2011 | Dixit | |

OTHER PUBLICATIONS

International Search Report and Written Opinion issued in PCT App. No. PCT/US23/10781, dated Apr. 13, 2023 (8 pages).

* cited by examiner

*Primary Examiner* — Claire A Norris
(74) *Attorney, Agent, or Firm* — Ewing & Jones, PLLC

(57) ABSTRACT

A process includes supplying a waste completion fluid including a viscosifier polymer; and treating the waste completion fluid with a non-oxidizing inorganic acid to form a metal bromide brine. The process also includes coagulating the viscosifier polymer and collecting the viscosifier polymer.

10 Claims, 2 Drawing Sheets

VISCOSIFIER REMOVAL FROM BRINES

CROSS REFERENCE TO RELATED APPLICATIONS

This application is a nonprovisional application which claims priority from U.S. provisional application No. 63/302,233, filed Jan. 24, 2022, which is incorporated by reference herein in its entirety

FIELD OF DISCLOSURE

The present disclosure relates to a process of removing viscosifier polymers from aqueous-based fluids.

BACKGROUND

Viscosifiers are polymers added to fluids to increase the viscosity of the fluid. Examples of commonly used viscosifier polymers are xanthan gum, hydroxyethyl cellulose, starch or their modified derivatives. Viscosifier polymers are often added to brines used to drill and complete oil and gas wells. In such cases, the increased viscosity helps the brine remove contaminants, such as drilling muds and solids, from the well. Increased viscosity also reduces fluid loss. Traditional viscosifier polymers impart a non-Newtonian rheology behavior to the brines, enabling easy delivery by pump, but slow to penetrate the geological formation. The type and amount of viscosifier polymer added to a brine depends on the purpose of the brine and the nature of the targeted geological formation. The altered viscosity of the brine may make recovery and reuse of the brine challenging as the different purposes of fluids or different geological formations often require a different viscosity and preferred viscosifier.

While methods for removing viscosifier polymers exist, these methods for removal take considerable time and may inefficiently remove the viscosifier. For example, brines with viscosifier polymers may be treated with calcium or lithium hypochlorite, which slowly degrades the viscosifier polymer, often requiring 14 days or longer to complete. If, after treatment, the amount of viscosifier polymer remaining in the fluid is too high to allow for reuse of the brine, the brine is discarded. Even if the hypochlorite treatment is successful, reuse of the brine may be limited as the treatment results in the often undesirable introduction of chloride to the brine.

SUMMARY

In an embodiment of the present disclosure, a process is included. The process includes supplying a waste completion fluid including a viscosifier polymer; and treating the waste completion fluid with a non-oxidizing inorganic acid to form a metal bromide brine. The process also includes coagulating the viscosifier polymer and collecting the viscosifier polymer.

BRIEF DESCRIPTION OF DRAWINGS

The present disclosure is best understood from the detailed description when read with the accompanying figures. In accordance with the standard practice in the industry, various features are not drawn to scale. Schematic drawings are structural or procedural diagrams.

DETAILED DESCRIPTION

Figure 1:
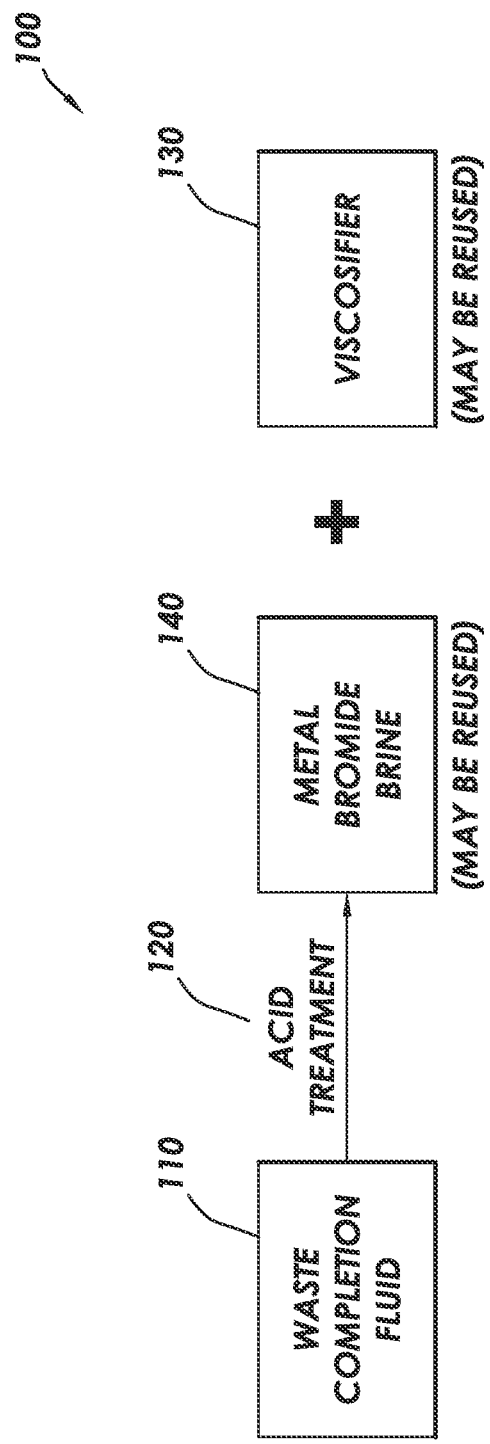
FIG. 1 is a schematic view of an embodiment of a bromide brine reuse method consistent with the present disclosure.

The following disclosure provides many different embodiments and examples. Specific examples of equipment and arrangements are described below to simplify the present disclosure. These are merely examples and are not intended to be limiting. In addition, the present disclosure may repeat reference numerals and/or letters in the various examples. This repetition is for simplicity and clarity and does not in itself dictate a relationship between the various embodiments and/or configurations discussed.

Various terms are used herein. To the extent a term used in a claim is not defined below, it should be given the broadest definition skilled persons in the pertinent art have given that term as reflected in printed publications and issued patents at the time of filing. Further, unless otherwise specified, all compounds described herein may be substituted or unsubstituted and the listing of compounds includes derivatives thereof.

Further, various ranges and/or numerical limitations may be expressly stated below. It should be recognized that any ranges include iterative ranges of like magnitude falling within the expressly stated ranges or limitations.

A method of removal of viscosifiers from aqueous-based fluids, such as bromide-based brines used to drill and complete oil and gas wells, is disclosed herein. The removal of the viscosifier may result in an aqueous-based fluid that can be reformulated and reused as a bromide-based fluid where the viscosifier is merely removed and/or the removal of the viscosifier from the aqueous-based fluid may allow the recovery of bromide from a used aqueous-based fluid in the form of hydrogen bromide.

FIG. 1 depicts viscosifier removal method 100. In certain embodiments of the present disclosure, a waste completion fluid, such as a metal bromide brine including a viscosifier, may be supplied (110). The waste completion fluid may be treated with an acid to coagulate the viscosifier polymer in acid treatment step 120. The acid is a non-oxidizing inorganic acid, such as sulfuric acid, hydrochloric acid, hydroiodic acid, or hydrobromic acid. In certain embodiments, chlorides are not added to the waste completion fluid. In certain embodiments, hydrobromic acid is used as the non-oxidizing acid. Acid treatment step 120 results in a coagulated polymer (130) that may be skimmed or filtered from the surface of the waste completion fluid. The coagulated polymer (130) may be reused in a completion fluid. Acid treatment step 120 results in a metal bromide brine (140) that may be reused. Acid treatment step 120 may be performed with a small amount of acid (e.g. 10 ml/kg brine).

Acid treatment step 120 is independent of the associated cation(s) and can be performed on sodium, potassium, zinc, calcium, cesium, or other bromide brines, any of their combinations, including mixed salts brines where there is more than one metal in the brine or mixed chloride/bromide brines.

It has been found that despite similar changes in pH and amount of acid added (when compared to other tested acids), hydrobromic acid was found to have the most beneficial effect in reduction of the viscosity and coagulation of the viscosifier. The reduction was observed immediately upon addition of a small (e.g. 10-20 milliliters of 48 wt. % HBr to 1000 g bromide brine) amount of hydrobromic acid. A time and temperature study showed that an increase in temperature has a potentially desirable effect on the speed with which the polymer coagulates. For example, at reflux temperature, the viscosifier polymer coagulated completely within 1-3 minutes. Lower temperature required longer times for complete coagulation. By comparison, sulfuric acid was found to cause the viscosifier to coagulate after reflux for 30 minutes to four hours depending on the type and concentration of the viscosifier polymer.

Sulfuric acid, hydrochloric acid and hydroiodic acid were found to be capable of causing the viscosifier polymer to coagulate, these acids required longer reaction times than did hydrobromic acid at the same temperature, up to and including reflux conditions.

Further, treating the bromide brine fluid with hydrobromic acid in acid treatment step 120 does not introduce new components to the brine. Once the viscosifier is removed, after heating with hydrobromic acid and filtration, the brine may be neutralized with calcium oxide or calcium hydroxide to a neutral pH value, which would generate in situ calcium bromide, often a component of the starting bromide brine. The resulting liquid may be substantially viscosifier free and ready for reuse or re-formulation.

The hydrobromic acid may be introduced in acid treatment step 120 in different ways. For example, the hydrobromic acid may be introduced as an aqueous hydrobromic acid solution or as a hydrogen bromide gas. If the aqueous fluid is to be reused, the hydrobromic acid may be added as concentrated solution as to avoid the dilution of the brine fluid (typically commercially available as 48 or 62 wt. %).

Figure 2:
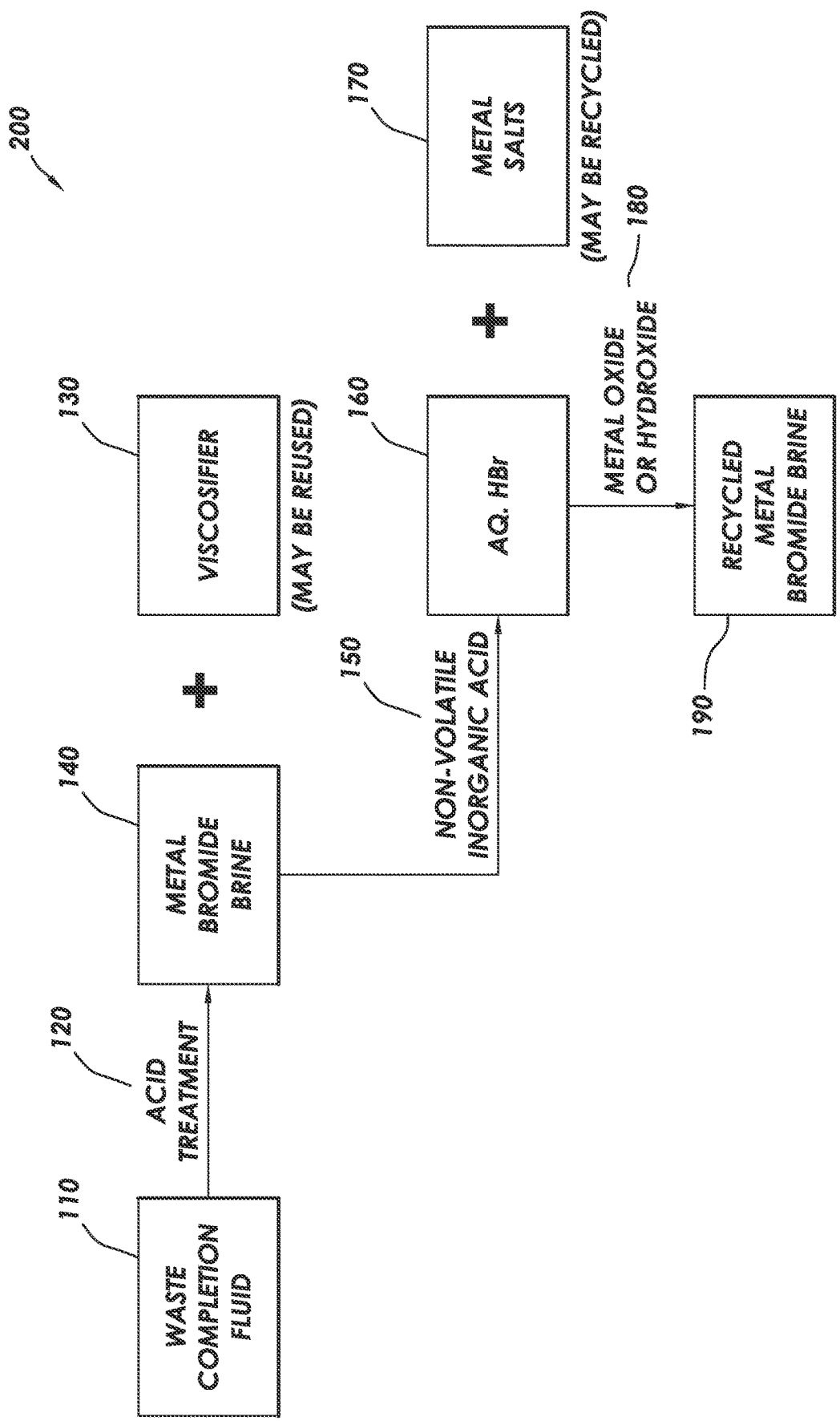
FIG. 2 is a schematic view of an alternate embodiment of a bromide brine reuse method consistent with the present disclosure.

In another embodiment, shown in FIG. 2 as viscosifier removal method 200, the metal bromide brine (140) may be treated with an acid to coagulate the viscosifier polymer in acid treatment step 120, as described above. After the viscosifier is removed, metal bromide brine 140 may be subject to second acid treatment 150. In second acid treatment 150, which may be performed at distillation conditions, second amount of acid may be added in excess to stoichiometric to the total halide present (e.g., 5-20%). The acid for second acid treatment 150 may be a non-volatile inorganic acid such as sulfuric or phosphoric acid. The acidification from second acid treatment 150 results in the formation of hydrobromic acid (160) that may be recovered by distillation and metal salts (170).

In certain embodiments, coagulated polymer (130) is removed before the hydrobromic acid recovery by distillation as the viscosifier presence may result in localized overheating, poor mass transfer and difficulty in removing precipitates that form in the stoichiometric acidification. The viscosifier polymers may also react with any excess acid in second acid treatment 150, forming byproducts and consuming hydrobromic and sulfuric acids.

In certain embodiments, aqueous hydrobromic acid may be combined with metal oxides or hydroxides (180) to form a recycled metal bromide brine (190).

EXAMPLES

Approximately 2 ml of 48 wt. % aqueous hydrobromic acid were added to 300 ml bromide containing brine with a viscosifier. The resulting mixture was heated to reflux with gentle stirring. Soon after reaching reflux, which took approximately one minute, the viscosifier appeared as a flocculant on the liquid surface. The flocculant was removed from the fluid by filtration.

Approximately 2 ml of 48 wt. % aqueous hydrobromic acid was added to 300 ml bromide containing brine with a viscosifier. The resulting mixture was stirred well and then left at 70° C. In six to eight hours, the flocculated viscosifier was removed by skimming or filtering.

Approximately 2 ml of 48 wt. % aqueous hydrobromic acid was added to 300 ml viscosifier-containing bromide brine. The resulting mixture was stirred well and then left at 50° C. In 12-18 hours, the flocculated viscosifier was removed by skimming or filtering.

Approximately 2 ml of 48 wt. % aqueous hydrobromic acid was added to 300 ml viscosifier-containing bromide brine. The resulting mixture was stirred well and then left at ambient temperature (approximately 21° C.). In one to three weeks, the flocculated viscosifier was removed by skimming or filtering.

Approximately 5 ml of 96 wt. % sulfuric acid was added to 300 ml viscosifier-containing bromide brine. The resulting mixture was stirred well and brought to a reflux. In three to six hours, the flocculated viscosifier and the formed $CaSO_4$ precipitate were removed by skimming or filtering.

Approximately 5 ml of 5 molar (5M) hydrochloric acid was added to 300 ml viscosifier-containing bromide brine. The resulting mixture was stirred well and brought to a reflux. In three to six hours, the flocculated viscosifier was removed by skimming or filtering.

Approximately 2 ml of 5 molar (5M) hydrochloric acid was added to 100 ml viscosifier containing bromide brine. Approx. 0.4 g KI was added, which in-situ formed the equivalent of hydroiodic acid (HI). The resulting mixture was stirred well and kept at 70° C. for 8 hours. The flocculated viscosifier was removed by skimming or filtering.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

What is claimed is:

1. A process comprising:
   supplying a waste completion fluid including a viscosifier polymer and a bromide brine;
   treating the waste completion fluid with a non-oxidizing inorganic acid to form a metal bromide brine, the non-oxidizing inorganic acid being sulfuric acid, hydrochloric acid, hydroiodic acid, or hydrobromic acid;
   coagulating the viscosifier polymer completely within one to three minutes; and
   collecting the viscosifier polymer.

2. The process of claim 1, wherein chloride is not added to the waste completion fluid.

3. The process of claim 1, wherein the non-oxidizing inorganic acid is hydrobromic acid.

4. The process of claim 3, wherein the waste completion fluid is a sodium, potassium, zinc, cesium, or calcium bromide brine.

5. The process of claim 1, wherein the hydrobromic acid is an aqueous hydrobromic acid solution or a hydrogen bromide gas.

6. A process comprising:
supplying a waste completion fluid including a viscosifier polymer and a bromide brine;
treating the waste completion fluid with a non-oxidizing inorganic acid to form a metal bromide brine;
coagulating the viscosifier polymer;
collecting the viscosifier polymer; and after the step of collecting the viscosifier polymer:
treating the metal bromide brine with a non-volatile inorganic acid to form aqueous hydrobromic acid and metal sales.

7. The method of claim 6, wherein the non-volatile inorganic acid is sulfuric acid or phosphoric acid.

8. The method of claim 6, wherein the non-volatile inorganic acid is added in stoichiometric excess.

9. The method of claim 6, wherein the viscosifier polymer is removed prior to treating the metal bromide brine.

10. The method of claim 6 further comprising combining the aqueous hydrobromic acid with a metal oxide or hydroxide to form a recycled metal bromide brine.

\* \* \* \* \*